Sept. 23, 1969 E. M. STRYKER, JR 3,468,255

INTERVALOMETER

Filed Feb. 19, 1968

INVENTOR.
EDWIN M. STRYKER JR.

BY Albin Medved
ATTORNEY

United States Patent Office 3,468,255

Patented Sept. 23, 1969

3,468,255
INTERVALOMETER

Edwin M. Stryker, Jr., New Brighton, Minn., assignor to Honeywell Inc., Minneapolis, Minn., a corporation of Delaware Filed Feb. 19, 1968, Ser. No. 706,233
Int. Cl. F42c *13/00*
U.S. Cl. 102—70.2 8 Claims

ABSTRACT OF THE DISCLOSURE

A solid state intervalometer circuit utilizing silicon controlled rectifiers to activate a series of explosive squibs sequentially at predetermined intervals or singly in response to a pulse input. The intervalometer stages are interdependent with diode coupling.

Background of the invention

The present invention relates to intervalometer systems with electrically initiated switch actuation.

Prior art intervalometer circuits have been electromechanical in nature employing such devices as rotary solenoids. A rotary solenoid intervalometer is a bulky device as compared to the state of the art switching circuits. The moving parts inherent in an electro-mechanical intervalometer result in a reliability factor lower than that attainable by solid state circuitry.

Electro-mechanical intervalometers have a further limitation in that the minimum intervals between switching is on the order of 40 milliseconds while the present invention allows switching at 10 millisecond intervals. The present invention utilizes current responsive load elements as an active portion of the intervalometer circuit, producing an interdependency between the intervalometer stages.

Electro-mechanical intervalometers are limited in that the number of stages depends upon the number of contacts on the rotary solenoid. The present invention allows for the easy addition or removal of stages as required.

Summary of the invention

The present invention is concerned with an intervalometer system used to activate a current responsive device characterized by an initially low impedance state and a high impedance state into which it is switched when the current through it exceeds a predetermined level. The intervalometer system employs the current responsive devices as active elements, producing an interdependency between adjacent stages through diode coupling. The intervalometer employs solid state circuitry to allow activation of the current response devices upon application of an input control signal: singly, in response to a pulse input or sequentially at predetermined intervals in response to a DC input.

It is therefore an object of the present invention to provide an improved intervalometer circuit allowing rapid switch rates with increased reliability and flexibility.

Description of the drawings

The drawings show the preferred embodiments of the invention using silicon controled rectifiers to fire explosive squibs.

Squibs are current responsive explosive charges characterized by a low impedance in the unfired state and a high impedance after firing. The squib of the type shown in the preferred embodiments has a resistance of one to three ohms before firing and, after firing, has a minimum resistance of approximately 10*k* ohms, requiring approximately five amps to fire.

Description of the preferred embodiments

Figure 1:
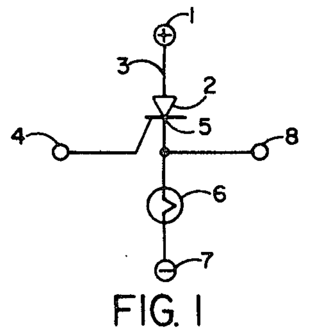
FIGURE 1 shows a single stage or "firing channel" of the invention.

FIGURE 1 shows the squib "firing channel" wherein a silicon controlled rectifier (SCR) 2, having an anode electrode 3, a cathode electrode 5, and a voltage responsive gate electrode 4, is connected in series with a squib 6 between a first input terminal 1 and a second input terminal 7. An output terminal 8 is connected to the second current electrode 5 of the switching means 2. Input terminals 1 and 7 are connected respectively to positive and negative terminals of a DC source.

In the operation of FIGURE 1, input terminals 1 and 7 are connected to a DC source capable of supplying sufficient current to fire squib 6. A control signal applied to the gate electrode 4 causes SCR 2 to conduct, current flowing through squib 6 causing it to explode and switch to a high impedance state. The impedance between output 8 and input terminal 7 indicates the state of squib 6.

Figure 2:
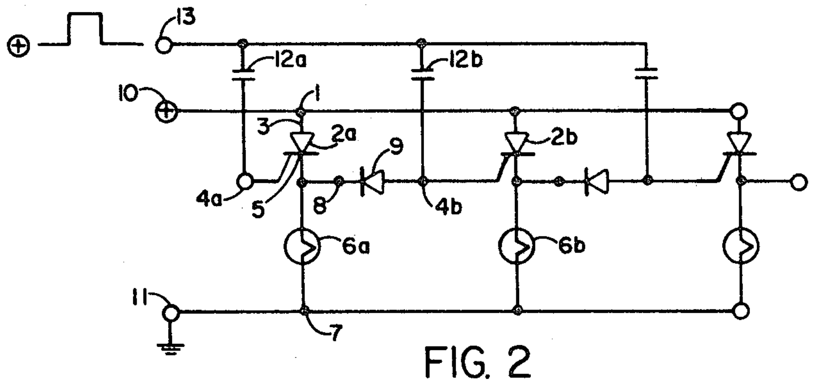
FIGURE 2 is an embodiment of the invention in which each successive squib is fired upon the application and reapplication of an input signal.

FIGURE 2 is an embodiment of the invention comprising "firing channels" as shown in FIGURE 1 connected in parallel. The first input terminal 1 of each stage is connected to a positive power input terminal 10 and each second input terminal 7 is connected to a reference terminal 11. A capacitor 12 is connected between the gate electrode 4 of each stage and a control signal input 13. A diode 9 is connected between the output terminal 8 of each stage and the control electrode 4 of each succeeding stage, with the direction of easy current flow toward the output terminal 8 of the preceding stage.

In the operation of FIGURE 2, a DC source is applied between terminals 10 and 11. In the absence of a positive signal at control signal input 13, the SCR **2*a* will be OFF and no current will be conducted through squib 6*a*. Application of a positive control signal to control input 13 causes a positive pulse to appear at gate electrode 4*a*, turning SCR 2*a* ON. At this time capacitor 12*b* in the following stage is charged substantially to the level of the control signal as gate electrode 4*b* is held at a low potential through diode 9 and squib 6*a* of the previous stage, preventing turn-on of SCR 2*b***.

As the control signal is applied and SCR **2*a* is turned ON, current is conducted through squib 6*a*, firing the squib. Diode 9 prevents current flow away from output terminal 8. After squib 6*a* fires, (thereafter presenting a high impedance) gate electrode 4*b* of the following stage is "lifted" from ground. However, capacitor 12*b* has been charged to the level of the control signal and the voltage at the gate electrode 4*b* remains near zero, SCR 2*b* remaining nonconductive. Removal and reapplication of the control voltage turns on SCR 2*b*, firing squib 6*b*. Again, the following stages remain unfired due to grounding of their respective control electrodes through the unfired squib in the previous stage, allowing capacitor 12** to charge.

Figure 3:
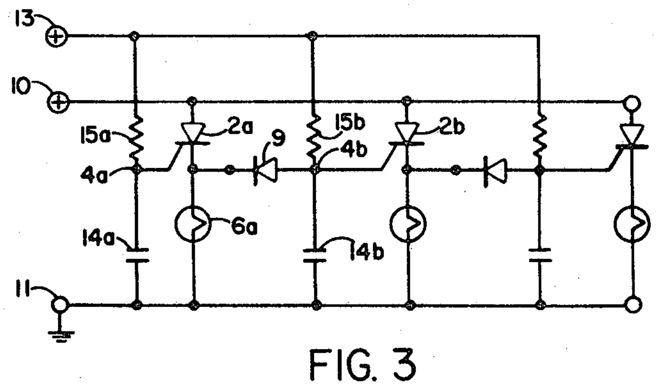
FIGURE 3 is an embodiment of the invention having a fixed rate of firing in response to a DC control signal.

FIGURE 3 is an embodiment of the invention having a predetermined time interval between squib firing. As in FIGURE 2, a plurality of "firing channels" or stages as shown in FIGURE 1 are connected in parallel between a positive power input terminal 10 and a reference terminal 11. FIGURE 3 differs from FIGURE 2 in the connection between gate electrodes 4 and the control signal input 13. In FIGURE 3, a capacitor 14 is connected between gate electrode 4 of each stage and the reference terminal 11. A resistor 15 is connected between gate electrode 4 of each stage and contol input 13. A diode is connected between the output 8 of a stage and gate electrode 4 of the following stage in the same manner as shown in FIGURE 2.

In the operation of FIGURE 3, a DC source is connected between power input terminal 10 and reference terminal 11. A positive DC potential applied to control signal input 13 initiates firing. Capacitor 14*a* is charged through resistor 15*a* until the potential at gate electrode 4*a* of SCR 2*a* is high enough to turn ON SCR 2*a*, firing squib 6*a*. Before squib 6*a* fires, gate electrode 4*b* of SCR 2*b* in the following stage is held near ground potential by squib 6*a*, preventing capacitor 14*b* from charging. After squib 6*a* fires and "opens," capacitor 14*b* charges through resistor 15*b*. The time between firing of adjacent stages, for a given control voltage, is therefore dependent on the time constant of resistor 15 in series with capacitor 14.

One application of the present invention is in munitions dispenser pods as found on military aircraft. A squib is used to release the explosives from a compartment of the dispenser, the time between release of the explosives determining the destructive pattern which the explosives cause on the ground. The circuit of FIGURE 3, having a fixed time interval between firing, requires that the aircraft speed be adjusted to a predetermined rate to obtain a particular pattern. The embodiment shown in FIGURE 2 can be driven by clock pulses, the frequency of the clock being adjustable to compensate for the speed of the aircraft.

I claim:

1. An intervalometer comprising, in combination:
means for connecting a reference potential;
power input means;
control signal input means;
a plurality of stages, each said stage comprising first and second input terminals, output means, current responsive impedance means connected between said output means and said second input terminal, switching means, having control means, connected between said output means and said first input terminal;
means connecting said input terminals of said plurality of stages to said means for connecting a reference potential;
means connecting said first input terminals of said plurality of stages to said power input means;
means connecting said control means of said plurality of stages to said control signal input means; and
diode means connecting said output of each preceding said stage to said control means of said switching means of the succeeding said stage, said diode means permitting current flow from said control means to said output means.

2. The apparatus of claim 1 wherein said switching means is a silicon controlled rectifier.

3. The apparatus of claim 1 wherein said current responsive impedance means is a squib.

4. The apparatus of claim 1 wherein said means connecting said control means of said plurality of stages to said control signal input means includes a capacitor.

5. The apparatus of claim 1 wherein said means connecting said control means of said plurality of stages to said control signal input means includes a resistor and wherein a capacitor means is connected between said control means of each of said plurality of stages and said means for connecting a reference potential.

6. An intervalometer comprising, in combination:
a plurality of stages, each said stage comprising
first and second input terminals,
switching means having first and second current electrodes and a voltage responsive gate electrode responsive to signals of a first polarity for controlling the impedance between said first and second current electrodes,
means connecting said first current electrode to said first input terminal,
current responsive impedance means connected between said second current electrode of said switching means and said second input terminal, said current responsive impedance means having having a normally low impedance state and having a high impedance state into which it is switched when the current through it exceeds a predetermined level, and
an output connected to said second current electrode of said switching means, the impedance between said output and said second input terminal depending on the impedance state of said current responsive impedance means, means for connecting a reference potential;
power input means;
control signal input means;
means connecting said second input terminals of said plurality of stages to said means for connecting a reference potential;
means connecting said first input terminals of said plurality of stages to said power input means;
a plurality of means connecting said control signal input means to said voltage responsive gate electrode of each of said plurality of stages; and
unidirectional current conducting means connecting said output of each preceding said stage to said control means of said switching means of the succeeding said stage, said unidirectional current conducting means providing a low impedance path to said output means for a signal of said first polarity at said voltage responsive gate electrode.

7. The apparatus of claim 6 wherein said means connecting said control signal input means to said voltage responsive gate electrode includes a capacitor.

8. The apparatus of claim 6 wherein said means connecting said control signal input means to said voltage responsive gate electrode includes a resistor and wherein a capacitor means is connected between said voltage responsive gate electrode of each of said stages and said second power input means.

References Cited

UNITED STATES PATENTS

| | | | |
|---|---|---|---|
| 3,306,208 | 2/1967 | Bergey et al. | 102—70.2 |
| 3,312,086 | 4/1967 | Casebeer et al. | 317—80 |
| 3,312,869 | 4/1967 | Werner | 317—80 |
| 3,316,451 | 4/1967 | Silberman | 317—80 |

VERLIN R. PENDEGRASS, Primary Examiner

U.S. Cl. X.R.

317—80